US 6,868,495 B1

(12) United States Patent
Glover

(10) Patent No.: US 6,868,495 B1
(45) Date of Patent: Mar. 15, 2005

(54) ONE-TIME PAD ENCRYPTION KEY DISTRIBUTION

(75) Inventor: John J. Glover, Bedford, NH (US)

(73) Assignee: Open Security Solutions, LLC, Waban, MA (US)

( * ) Notice: Subject to any disclaimer, the term of this patent is extended or adjusted under 35 U.S.C. 154(b) by 426 days.

(21) Appl. No.: 09/621,187

(22) Filed: Jul. 21, 2000

Related U.S. Application Data

(63) Continuation of application No. 09/545,065, filed on Apr. 7, 2000, now Pat. No. 6,185,686, which is a continuation of application No. 08/887,723, filed on Jul. 3, 1997, now Pat. No. 6,052,780.
(60) Provisional application No. 60/145,169, filed on Jul. 22, 1999, and provisional application No. 60/025,991, filed on Sep. 12, 1996.

(51) Int. Cl.[7] .............................................. H04L 9/00
(52) U.S. Cl. .................... 713/190; 713/150; 713/161; 713/165; 713/189; 713/193; 713/200; 713/201; 380/277; 705/57; 705/58
(58) Field of Search ................................. 713/150, 161, 713/165, 189, 193, 200, 201; 380/277; 705/57, 58

(56) References Cited

U.S. PATENT DOCUMENTS

| | | | | |
|---|---|---|---|---|
| 4,888,798 A | * | 12/1989 | Earnset ........................ 380/4 |
| 4,965,804 A | | 10/1990 | Trbovich et al. |
| 5,003,598 A | * | 3/1991 | Kunstadt .................... 380/48 |
| 5,161,194 A | | 11/1992 | Ujiie |
| 5,555,304 A | | 9/1996 | Hasebe et al. |
| 5,598,470 A | * | 1/1997 | Cooper et al. ................. 380/4 |
| 5,724,423 A | * | 3/1998 | Khello ....................... 713/184 |
| 5,727,061 A | | 3/1998 | Johnson et al. |
| 5,778,071 A | | 7/1998 | Caputo et al. |
| 5,799,090 A | * | 8/1998 | Angert ........................ 380/43 |
| 5,995,623 A | * | 11/1999 | Kawano et al. ............ 713/189 |
| 6,169,804 B1 | * | 1/2001 | Ryan .......................... 380/51 |
| 6,445,794 B1 | * | 9/2002 | Shefi .......................... 380/46 |
| 2002/0002675 A1 | * | 1/2002 | Bush .......................... 713/160 |
| 2003/0026431 A1 | * | 2/2003 | Hammersmith ............. 380/277 |

* cited by examiner

Primary Examiner—Ayaz Sheikh
Assistant Examiner—Taghi T. Arani
(74) Attorney, Agent, or Firm—Wolf, Greenfield & Sacks, P.C.

(57) ABSTRACT

Some of these problems with digital information protection systems may be overcome by providing a mechanism which allows a content provider to encrypt digital information without requiring either a hardware or platform manufacturer or a content consumer to provide support for the specific form of corresponding decryption. This mechanism can be provided in a manner which allows the digital information to be copied easily for back-up purposes and to be transferred easily for distribution, but which should not permit copying of the digital information in decrypted form. In particular, the encrypted digital information is stored as an executable computer program which includes a decryption program that decrypts the encrypted information to provide the desired digital information, upon successful completion of an authorization procedure by the user. In combination with other mechanisms that track distribution, enforce royalty payments and control access to decryption keys, the present invention provides an improved method for identifying and detecting sources of unauthorized copies. Suitable authorization procedures also enable the digital information to be distributed for a limited number of uses and/or users, thus enabling per-use fees to be charged for the digital information.

15 Claims, 8 Drawing Sheets

ONE-TIME PAD ENCRYPTION KEY DISTRIBUTION

CROSS-REFERENCE TO RELATED APPLICATIONS

This application claims priority under 35 U.S.C. §119 to provisional patent application serial No. 60/145,169 filed Jul. 22, 1999, and claims priority under 35 U.S.C. §120 as a continuing application of U.S. patent application Ser. No. 09/545,065 now U.S. Pat. No. 6,185,686 filed Apr. 7, 2000, now pending which is a continuing application of U.S. patent application Ser. No. 08/887,723 now U.S. Pat. No. 6,052,780 filed Jul. 3, 1997 and now U.S. Pat. No. 6,052,780, which claims priority under 35 U.S.C. §119 to U.S. patent application Ser. No. 60/025,991, filed Sep. 12, 1996, now abandoned, which are all hereby incorporated by reference.

BACKGROUND OF THE INVENTION

A serious problem which faces the electronic publishing and software industries is the ease with which digital information can be copied without authorization from the publisher. Digital information also may be used or modified without authorization. For example, computer software may be reverse engineered or attacked by computer viruses.

There are many mechanisms available which may be used to limit or prevent access to digital information. Such mechanisms often either restrict the ability of the user to make back-up copies or involve the use of special purpose hardware to limit access to the digital information. For example, some mechanisms restrict the use of digital information to a particular machine. See, for example, U.S. Pat. No. 4,817,140. Other mechanisms require the digital information to be stored on a particular recording medium in order to be used. See, for example, U.S. Pat. No. 5,412,718. Yet other mechanisms allow only a certain number of uses of the digital information. See for example, U.S. Pat. No. 4,888,798. Many of these access control mechanisms cause distribution to be more costly.

Several other patents describe a variety of systems for encryption, compression, licensing and royalty control and software distribution such as: U.S. Pat. No. 4,405,829, U.S. Pat. No. 4,864,616, U.S. Pat. No. 4,888,800, U.S. Pat. No. 4,999,806, U.S. Pat. No. 5,021,997, U.S. Pat. No. 5,027,396, U.S. Pat. No. 5,033,084, U.S. Pat. No. 5,081,675, U.S. Pat. No. 5,155,847, U.S. Pat. No. 5,166,886, U.S. Pat. No. 5,191,611, U.S. Pat. No. 5,220,606, U.S. Pat. No. 5,222,133, U.S. Pat. No. 5,272,755, U.S. Pat. No. 5,287,407, U.S. Pat. No. 5,313,521, U.S. Pat. No. 5,325,433, U.S. Pat. No. 5,327,563, U.S. Pat. No. 5,337,357, U.S. Pat. No. 5,351,293, U.S. Pat. No. 5,341,429, U.S. Pat. No. 5,351,297, U.S. Pat. No. 5,361,359, U.S. Pat. No. 5,379,433, U.S. Pat. No. 5,392,351, U.S. Pat. No. 5,394,469, U.S. Pat. No. 5,414,850, U.S. Pat. No. 5,473,687, U.S. Pat. No. 5,490,216, U.S. Pat. No. 5,497,423, U.S. Pat. No. 5,509,074, U.S. Pat. No. 5,511,123, U.S. Pat. No. 5,524,072, U.S. Pat. No. 5,532,920, U.S. Pat. No. 5,555,304, U.S. Pat. No. 5,557,346, U.S. Pat. No. 5,557,765, U.S. Pat. No. 5,592,549, U.S. Pat. No. 5,615,264, U.S. Pat. No. 5,625,692, and U.S. Pat. No. 5,638,445.

Computer programs or other digital information also may be encrypted in order to prevent an individual from making a useful copy of the information or from reverse engineering a program. Even with such encryption, however, a computer program must be decrypted in order for a computer to load and execute the program. Similarly, other digital information must be decrypted before it can be accessed and used. Generally, digital information is decrypted to disk, and not to main memory of the computer which is more protected by the operating system, because decryption to main memory results in a significant loss of memory resources. If the purpose for using encryption is to prevent users from copying the digital information, then decryption of the information to accessible memory for use defeats this purpose.

One way to protect digital information using encryption has been made available by International Business Machines (IBM) and is called a "CRYPTOLOPE" information container. This technology is believed to be related to U.S. Pat. Nos. 5,563,946 and 5,598,470 (to Cooper et al.), and published European patent applications 0679977, 0679978, 0679979 and 0681233. The CRYPTOLOPE system requires a user to have a "helper application" and a key. The CRYPTOLOPE information container is generated by IBM. The content provider submits data to IBM, which in turn encrypts and packages the data in a CRYPTOLOPE information container. The helper application is a form of memory resident program, called a terminate and stay resident (TSR) program, which is a form of input/output (I/O) device driver installed in the operating system and which monitors requests from the operating system for files on specified drives and directories. Because the TSR program must know the directory, and/or file name to be accessed, that information also is available to other programs. Other programs could use that information to manipulate the operation of the TSR program in order to have access to decrypted contents of the information container. The encrypted information container includes an executable stub which is executed whenever the application is run without the installed TSR program or from a drive not monitored by the TSR program to prevent unpredictable activity from executing encrypted code. This stub may be used to install decryption and cause the application be executed a second time, or to communicate with the TSR program to instruct the TSR program to monitor the drive. It may be preferable from the point of view of the content provider however to maintain an encryption process and keys independently of any third party.

Multimedia content, such as a movie or hypertext presentation also may be stored on a digital versatile disk (DVD), sometimes called a digital video disk, compact disk read-only memory (CD-ROM), rewriteable compact disks (CD-RW) or other medium in an encrypted digital format for use with special-purpose devices. For example, concern about illegal copying of content from digital video disks or other digital media has resulted in a limited amount of content being available for such devices. This problem has caused representatives of both multimedia providers and digital video disk manufacturers to negotiate an agreement on an encryption format for information stored on DVDs. This copy protection scheme is licensed through an organization called the CSS Interim Licensing organization. However, in this arrangement, the content provider is limited to using the agreed upon encryption format and a device manufacturer is limited to using a predetermined decryption system.

Encryption has also been used to protect and hide computer viruses. Such viruses are typically polymorphic, i.e., they change every time they infect a new program, and are encrypted. The virus includes a decryption program that executes to decrypt the virus every time the infected program is run. Such viruses are described, for example, in "Computer Virus-Antivirus Coevolution" by Carey Nachenberg, *Communications of the ACM*, Vol. 40, No. 1, (Jan. 1997), p. 46 et seq. Such viruses include decryption keys within them since, clearly, their execution is not carried out by the user and a user would not be asked for authorization keys to permit execution of the viruses. Additionally, such viruses are typically only executed once at the start of execution of an infected program and permanently return control to the infected program after execution.

SUMMARY OF THE INVENTION

Some of these problems with digital information protection systems may be overcome by providing a mechanism which allows a content provider to encrypt digital information without requiring either a hardware or platform manufacturer or a content consumer to provide support for the specific form of corresponding decryption. This mechanism can be provided in a manner which allows the digital information to be copied easily for back-up purposes and to be transferred easily for distribution, but which should not permit copying of the digital information in decrypted form. In particular, the encrypted digital information is stored as an executable computer program which includes a decryption program that decrypts the encrypted information to provide the desired digital information, upon successful completion of an authorization procedure by the user.

In one embodiment, the decryption program is executed as a process within a given operating system and decrypts the digital information within the memory area assigned to that process. This memory area is protected by the operating system from copying or access by other processes. Even if access to the memory area could be obtained, for example through the operating system, when the digital information is a very large application program or a large data file, a copy of the entire decrypted digital information is not likely to exist in the memory area in complete form.

By encrypting information in this manner, a platform provider merely provides a computer system with an operating system that has adequate security to define a protected memory area for a process and adequate functionality to execute a decryption program. The content provider in turn may use any desired encryption program. In addition, by having a process decrypt information within a protected memory area provided by the operating system, the decrypted information does not pass through any device driver, memory resident program or other known logical entity in the computer system whose behavior may be controlled to provide unauthorized access to the data. The ability to reverse engineer or attack a computer program with a computer virus also may be reduced.

In another embodiment, the decryption program is part of a dynamically loaded device driver that responds to requests for data from the file containing the encrypted data. When the digital information product is first executed, this device driver is extracted from the file and is loaded into the operating system. The executed digital information product then informs the loaded device driver of the location of the hidden information in the file, any keys or other passwords, and the name of a phantom directory and file to be called that only the digital information product and the device driver know about. The name of this directory may be generated randomly. Each segment of hidden information in the digital information product may be assigned its own unique file name in the phantom directory. The digital information product then makes a call to the operating system to execute one of the files in the phantom directory. The loaded driver traps these calls to the operating system, accesses the original file, decrypts the desired information and outputs the desired information to the operating system.

In combination with other mechanisms that track distribution, enforce royalty payments and control access to decryption keys, the present invention provides an improved method for identifying and detecting sources of unauthorized copies. Suitable authorization procedures also enable the digital information to be distributed for a limited number of uses and/or users, thus enabling per-use fees to be charged for the digital information.

In one embodiment, encrypted data is combined with the key to decrypt it, such as a random one time pad. The encrypted data is stored on a computer readable medium with computer program instructions defining a decryption algorithm and identifying a location in the encrypted data of a pad and corresponding to an algorithm used to encrypt the encrypted data using the pad, wherein the pad is distributed throughout the encrypted data. The pad may be randomly distributed throughout the encrypted data.

In another embodiment, a one time pad may be used for encryption by requesting from a remote computer an amount of random data using an identifier. The data is encrypted using the random data. The encrypted random data is then sent with the identifier to a recipient that accesses the remote computer using the identifier to obtain the random data to decrypt the encrypted data. The identifier may include one or more parameters defining a trajectory for selecting blocks of random data from a multidimensional space associated with random data.

In another embodiment, a remote storage facility for storing data for a plurality of users receives requests from the plurality of users to store data. Each user may select a form of encryption. The data for each user is encrypted and stored according to the selected form of encryption for the user. With this kind of remote storage, if the encryption algorithm for one user is broken, the encrypted files for other users are not at risk.

In another embodiment, public, private key encryption of digital data in a protected memory may be provided by a device having a protected memory, a processor for decrypting self-decrypting data when authorized into the protected memory area, and storing a private key of the device. A database, accessible by the device, provides self-decrypting data to the device, and has a public key associated with the device. In response to a request for data, the database encrypts data according to the public key and a private key of an owner of the data, and sends self-decrypting data to the device. The self-decrypting data may include a public key of the owner of the data or the device may access a public key of the owner of the data via another mechanism.

In another embodiment, distribution of self-decrypting digital data is facilitated by having a system that can be accessed that has a selection of encryption algorithms. A user may select one of the encryption algorithms. The data is encrypted using the selected encryption algorithm, and is combined with a corresponding decryption algorithm. The combined encrypted data then may be made available on a computer network for access by a plurality of users.

DETAILED DESCRIPTION

The present invention will be more completely understood through the following detailed description which should be read in conjunction with the attached drawing in which similar reference numbers indicate similar structures.

Figure 1:
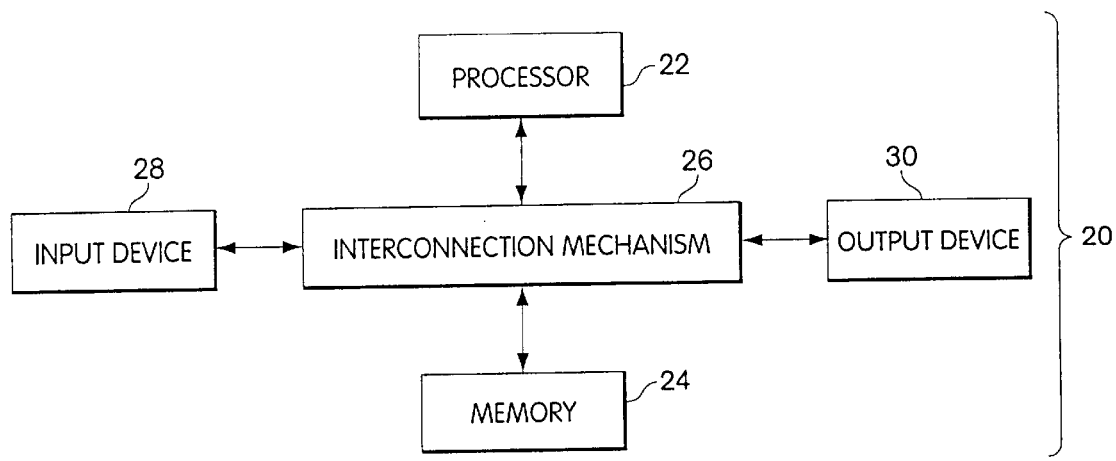
FIG. 1 is a block diagram of a typical computer system with which the present invention may be implemented.

Embodiments of the present invention may be implemented using a general purpose digital computer or may be implemented for use with a digital computer or digital processing circuit. A typical computer system 20 is shown in FIG. 1, and includes a processor 22 connected to a memory system 24 via an interconnection mechanism 26. An input device 28 also is connected to the processor and memory system via the interconnection mechanism, as is an output device 30. The interconnection mechanism 26 is typically a combination of one or more buses and one or more switches. The output device 30 may be a display and the input device may be a keyboard and/or a mouse or other cursor control device.

It should be understood that one or more output devices 30 may be connected to the computer system. Example output devices include a cathode ray tube (CRT) display, liquid crystal display (LCD), television signal encoder for connection to a television or video tape recorder, printers, communication devices, such as a modem, and audio output. It also should be understood that one or more input devices 28 may be connected to the computer system. Example input devices include a keyboard, keypad, trackball, mouse, pen and tablet, communication device, audio or video input and scanner. It should be understood that the invention is not limited to the particular input or output devices used in combination with the computer system or to those described herein.

The computer system 20 may be a general purpose computer system, which is programmable using a high level computer programming language, such as "C++," "Pascal," "VisualBasic." The computer system also may be implemented using specially programmed, special purpose hardware. In a general purpose computer system, the processor is typically a commercially available processor, such as the Pentium processor from Intel Corporation. Many other processors are also available. Such a processor executes a program called an operating system, such as Windows 95 or Windows NT 4.0, both available from Microsoft Corporation, which controls the execution of other computer programs and provides scheduling, debugging, input output control, accounting compilation, storage assignment, data management and memory management, and communication control and related services. Other examples of operating systems include: MacOS System 7 from Apple Computer, OS/2 from IBM, VMS from Digital Equipment Corporation, MS-DOS from Microsoft Corporation, UNIX from AT&T, and IRIX from Silicon Graphics, Inc.

The computer system 20 also may be a special purpose computer system such as a digital versatile disk or digital video disk (DVD) player. In a DVD player, there is typically a decoder controlled by some general processor which decodes an incoming stream of data from a DVD. In some instances, the DVD player includes a highly integrated DVD decoder engine. Such devices generally have a simple operating system which may be modified to include the capabilities described and used herein in connection with the typical operating systems in a general purpose computer. In particular, some operating systems are designed to be small enough for installation in an embedded system such as a DVD player, including the WindowsCE operating system from Microsoft Corporation and the JavaOS operating system from SunSoft Corporation. The operating system allows a content provider to provide its own programs that define some of the content, which is particularly useful for interactive multimedia. This capability also can be used to provide encryption and decryption, in accordance with the invention.

The processor and operating system define a computer platform for which application programs in a programming language such as an assembly language or a high level programming language are written. It should be understood that the invention is not limited to a particular computer platform, operating system, processor, or programming language. Additionally, the computer system 20 may be a multi-processor computer system or may include multiple computers connected over a computer network.

Figure 2:
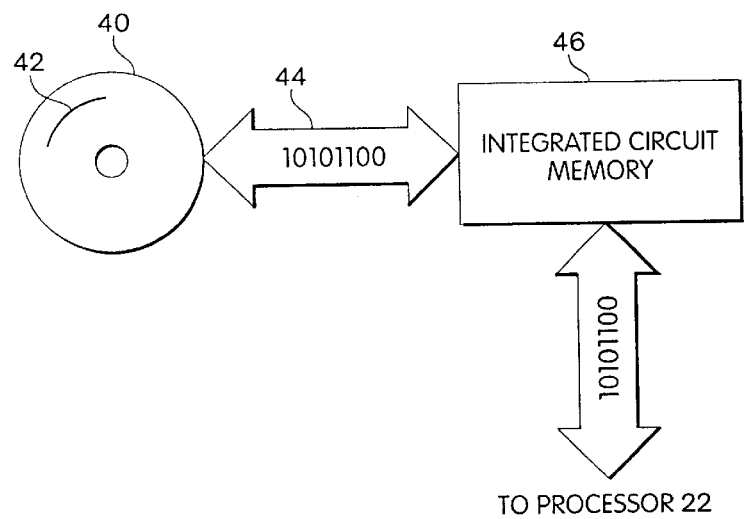
FIG. 2 is a block diagram of a memory system in the computer system of FIG. 1.

An example memory system 24 will now be described in more detail in connection with FIG. 2. A memory system typically includes a computer readable and writable nonvolatile recording medium 40, of which a magnetic disk, a flash memory, rewriteable compact disk (CD-RW) and tape are examples. The recording medium 40 also may be a read only medium such as a compact disc-read only memory (CD-ROM) or DVD. A magnetic disk may be removable, such as a "floppy disk" or "optical disk," and/or permanent, such as a "hard drive." The disk, which is shown in FIG. 2, has a number of tracks, as indicated at 42, in which signals are stored, in binary form, i.e., a form interpreted as a sequence of 1's and 0's, as shown at 44. Such signals may define an application program to be executed by the microprocessor, or information stored on the disk to be processed by the application program. Typically, in the operation of a general purpose computer, the processor 22 causes data to be read from the non-volatile recording medium 40 into an integrated circuit memory element 46, which is typically a volatile random access memory, such as a dynamic random access memory (DRAM) or static random access memory (SRAM). The integrated circuit memory element 46 allows for faster access to the information by the processor than disk 40, and is typically called the system or host memory. The processor generally causes the data to be manipulated within the integrated circuit memory 46 and may copy the data to the disk 40, if modified, when processing is completed. A variety of mechanisms are known for managing data movement between the disk 40 and the integrated circuit memory 46, and the invention is not limited thereto. It should also be understood that the invention is not limited to a particular memory system.

The file system of a computer generally is the mechanism by which an operating system manages manipulation of data between primary and secondary storage, using files. A file is a named logical construct which is defined and implemented by the operating system to map the name and a sequence of logical records of data to physical storage media. An operating system may specifically support various record types or may leave them undefined to be interpreted or controlled by application programs. A file is referred to by its name by application programs and is accessed through the operating system using commands defined by the operating system. An operating system provides basic file operations provided by for creating a file, opening a file, writing a file, reading a file and closing a file.

In order to create a file, the operating system first identifies space in the storage media which is controlled by the file system. An entry for the new file is then made in a directory which includes entries indicating the names of the available files and their locations in the file system. Creation of a file may include allocating certain available space to the file. Opening a file returns a handle to the application program which it uses to access the file. Closing a file invalidates the handle.

In order to write data to a file, an application program issues a command to the operating system which specifies both an indicator of the file, such as a file name, handle or other descriptor, and the information to be written to the file. Given the indicator of the file, the operating system searches the directory to find the location of the file. The directory entry stores a pointer, called the write pointer, to the current end of the file. Using this pointer, the physical location of the next available block of storage is computed and the information is written to that block. The write pointer is updated in the directory to indicate the new end of the file.

In order to read data from a file, an application program issues a command to the operating system specifying the indicator of the file and the memory locations assigned to the application where the next block of data should be placed. The operating system searches its directory for the associated entry given the indicator of the file. The directory may provide a pointer to a next block of data to be read, or the application may program or specify some offset from the beginning of the file to be used.

A primary advantage of using a file system is that, for an application program, the file is a logical construct which can be created, opened, written to, read from and closed without any concern for the physical storage used by the operating system.

The operating system also allows for the definition of another logical construct called a process. A process is a program in execution. Each process, depending on the operating system, generally has a process identifier and is represented in an operating system by a data structure which includes information associated with the process, such as the state of the process, a program counter indicating the address of the next instruction to be executed for the process, other registers used by process and memory management information including base and bounds registers. Other information also may be provided. The base and bounds registers specified for a process contain values representing the largest and smallest addresses that can be generated and accessed by an individual program. Where an operating system is the sole entity able to modify these memory management registers, adequate protection from access to the memory locations of one process from another process is provided. As a result, this memory management information is used by the operating system to provide a protected memory area for the process. A process generally uses the file system of the operating system to access files.

The present invention involves storing encrypted digital information, such an audio, video, text or an executable computer program, on a computer readable medium such that it can be copied easily for back-up purposes and transferred easily for distribution, but also such that it cannot be copied readily in decrypted form during use. In particular, the digital information is stored as a computer program that decrypts itself while it is used to provide the digital information, e.g., to provide executable operation code to the operating system of a computer, as the digital information is needed. Any kind of encryption or decryption may be used and also may include authorization mechanisms and data compression and decompression. In one embodiment of the present invention, decrypted digital information exists only in memory accessible to the operating system and processes authorized by the operating system. When the digital information is a large application program, a copy of the entire decrypted application program is not likely to exist in the main memory at any given time, further reducing the likelihood that a useful copy of decrypted code could be made. The decryption operation also is performed only if some predetermined authorization procedure is completed successfully.

Figure 3:
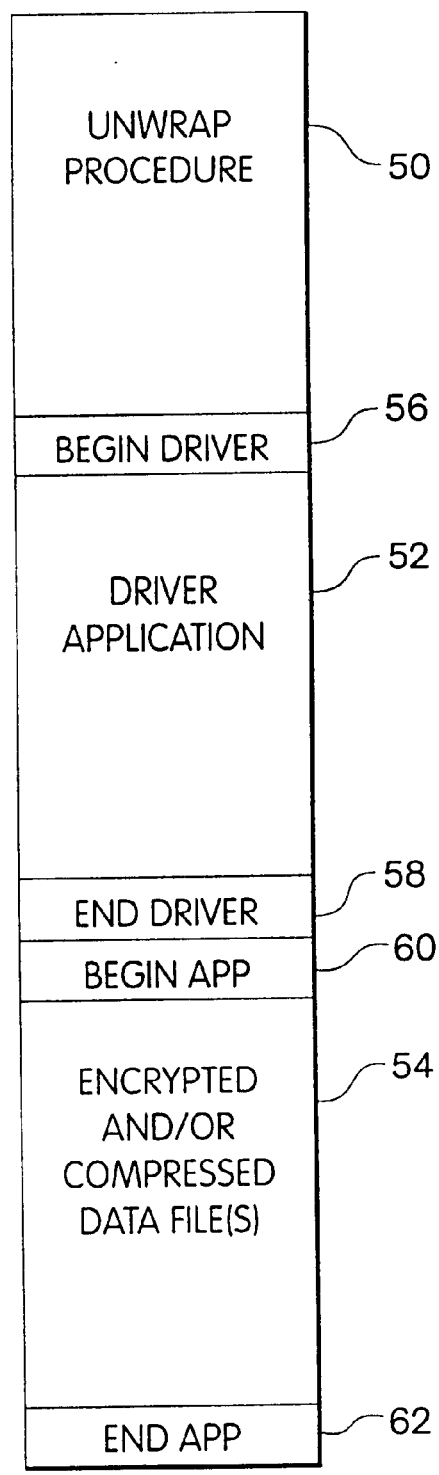
FIG. 3 is a diagram of a computer program or digital information product which may be recorded on a computer readable and writable medium, such as a magnetic disc.

One embodiment of the invention, in which the decryption program is a form of dynamically loaded device driver, will first be described. FIG. 3 illustrates the structure of digital information as stored in accordance with one embodiment of the present invention, which may be stored on a computer readable medium such as a magnetic disc or compact disc read only memory (CD-ROM) to form a computer program product. The digital information includes a first portion 50, herein called an unwrap procedure or application, which is generally unencrypted executable program code. The purpose of the unwrap procedure is to identify the locations of the other portions of the digital information, and may perform other operations such as verification. In particular, the unwrap procedure identifies and extracts a program which will communicate with the operating system, herein called a virtual device driver 52. The unwrap procedure may include decryption and decompression procedures to enable it to decrypt/decompress the driver, and/or other content of this file. The program 52 need not be a device driver. The virtual device driver 52 typically follows the unwrap procedure 50 in the file container, the digital information. The virtual device driver, when executed, decrypts and decodes the desired digital information such as an executable computer program code from hidden information 54, which may be either encrypted and/or encoded (compressed). It is the decrypted hidden information which is the desired digital information to be accessed. This hidden information may be any kind of digital data, such as audio, video, text, and computer program code including linked libraries or other device drivers.

In this embodiment of the computer program product, labels delineate the boundaries between the device driver and the hidden files. These labels may or may not be encrypted. A first label 56 indicates the beginning of the code for the virtual device driver 52. A second label 58 indicates the end of the virtual device driver code. Another label 60 indicates the beginning of the hidden information and a label 62 indicates the end of that application. There may be one or more blocks of such hidden information, each of which can be given a different name. It may be advantageous to use the name of the block of information in its begin and end tags. This computer program product thus contains and is both executable computer program code and one or more blocks of digital information. A table of locations specifying the location of each portion of the product could be used instead of labels. Such a table could be stored in a predetermined location and also may be encrypted.

The overall process performed using this computer program product in one embodiment of the invention will now be described in connection with FIG. 4. This embodiment may be implemented for use with the Windows95 operating system and is described in more detail in connection with FIGS. 5–7. An embodiment which may be implemented for use on the WindowsNT 4.0 operating system is described in more detail below in connection with FIG. 8. In both of these described embodiments, the digital information is an executable computer program which is read by the operating system as data from this file and is executed. The same principle of operation would apply if the data were merely audio, video, text or other information to be conveyed by a user.

Figure 4:
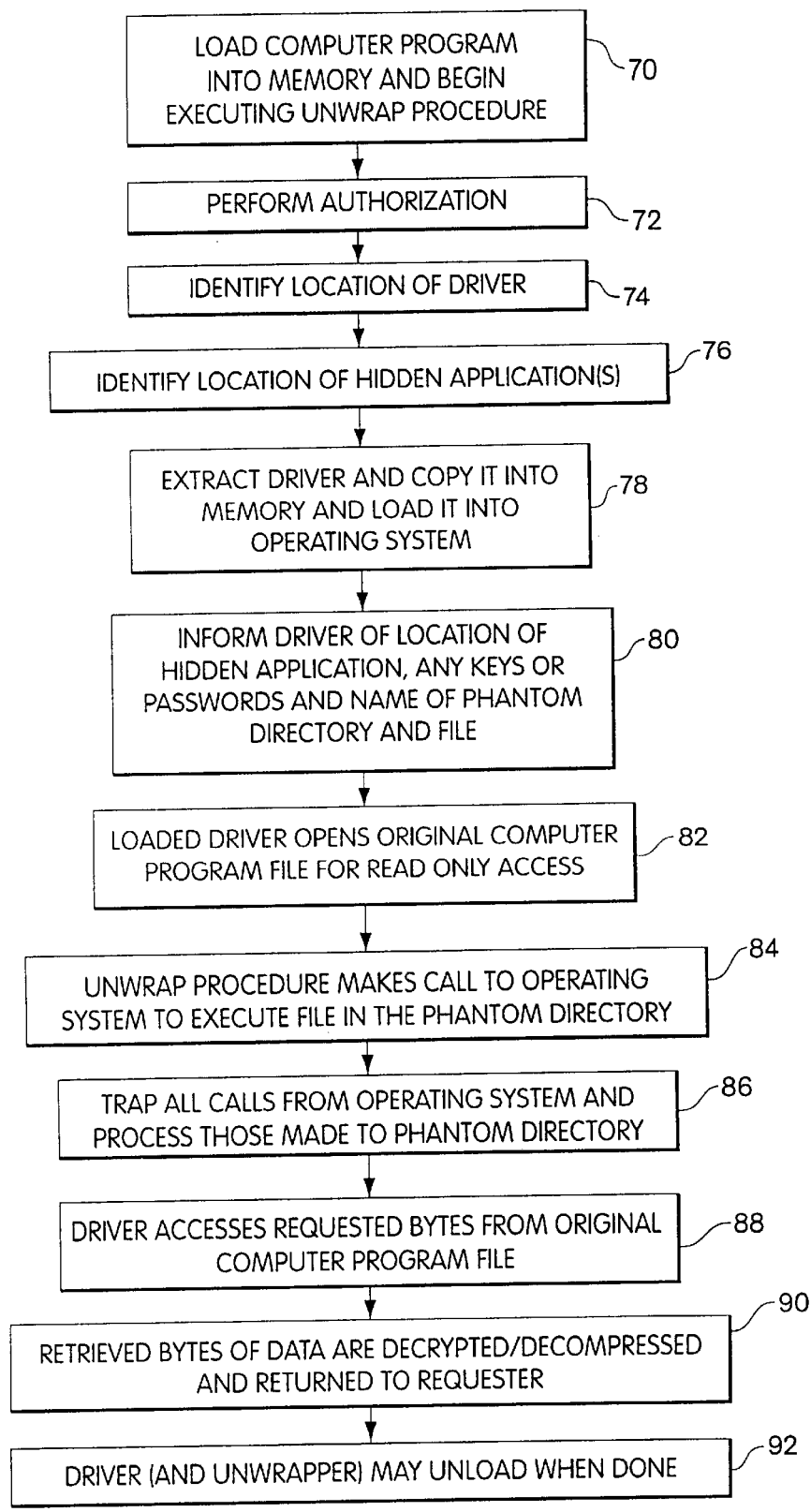
FIG. 4 is a flowchart describing how the computer program or digital information product of FIG. 3 is used.

In the embodiment of FIG. 4, the computer program is first loaded into memory in step 70, and the unwrap procedure 50 is executed by the operating system, as any typical executable computer program is executed. The unwrap procedure may perform authorization, for example by checking for a required password or authentication code, and may receive any data needed for decryption or decompression, for example keys or passwords, in step 72. Suitable authorization procedures may provide the ability to distribute software for single use. The unwrap procedure locates the virtual device driver 52 within the computer program in step 74, and then locates the hidden application in step 76. The virtual device driver 52 is then extracted by the unwrap procedure from the computer program, copied to another memory location and loaded for use by the operating system in step 78. An advantage of an operating system like Windows95 is that it allows such device drivers to be loaded dynamically without restarting the computer.

The executed unwrap procedure 50, in step 80, informs the loaded virtual device driver 52 of the location of the hidden information in the file, any keys or other passwords, and a name of a phantom directory and file to be called that only the unwrap procedure and the virtual device driver know about. The name of this phantom directory may be generated randomly. Each segment information hidden in the digital information product may be assigned its own unique file name in the phantom directory.

After the loaded virtual device driver 52 receives all communications from the unwrap procedure, it opens the original application file for read only access in step 82. The unwrap procedure then makes a call to the operating system in step 84 to execute the file in the phantom directory for which the name was transmitted to the loaded virtual device driver. One function of the loaded virtual device driver 52 is to trap all calls from the operating system to access files in step 86. Any calls made by the operating system to access files in the phantom directory are processed by the virtual device driver, whereas calls to access files in other directories are allowed to proceed to their original destination. In response to each call from the operating system, the virtual device driver obtains the bytes of data requested by the operating system from the original computer program file in step 88. These bytes of data are then decrypted or decompressed in step 90 and returned to the operating system. When processing is complete, the phantom application is unloaded from the operating system in step 92, and may be deleted from the memory.

Figure 5:
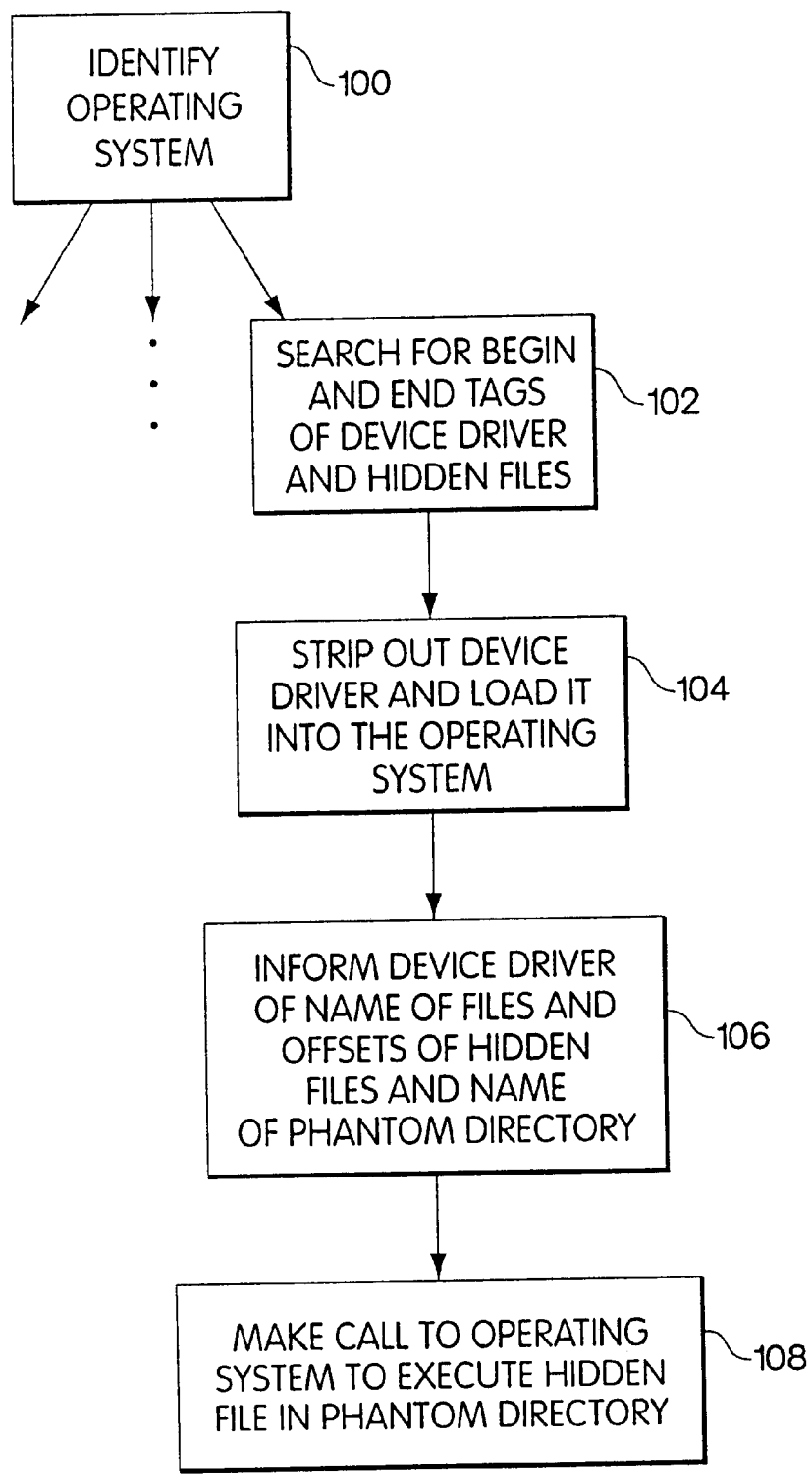
FIG. 5 is a flowchart describing operation of an example unwrap procedure as shown FIG. 3 in one embodiment of the invention.
Figure 6:
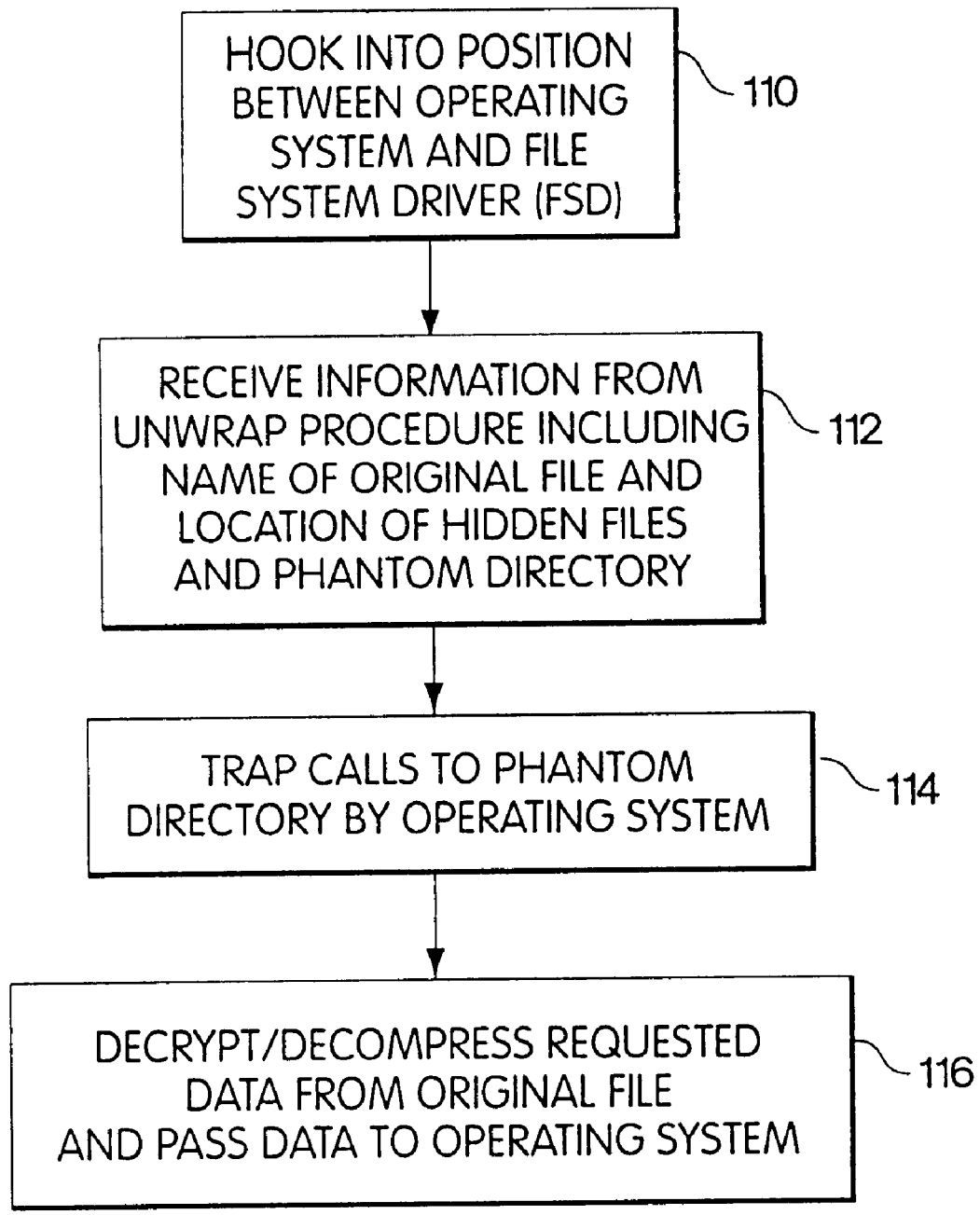
FIG. 6 is a flowchart describing operation of an example device driver as shown in FIG. 3 in one embodiment of the invention.
Figure 7:
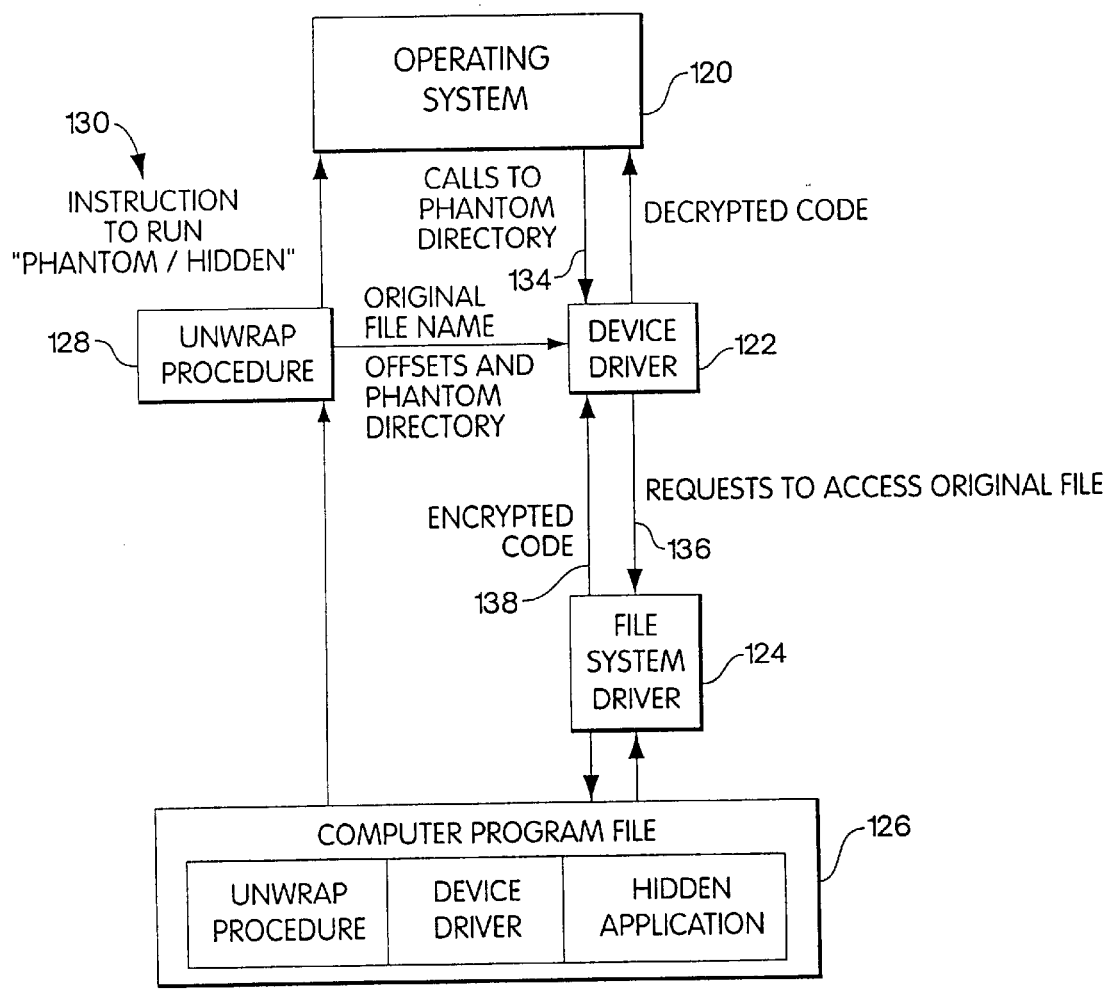
FIG. 7 block diagram of a computer system in the process of executing a computer program product in accordance with one embodiment of the invention.

A more detailed description of the process of FIG. 4 will now be described in connection with FIGS. 5–7. FIG. 5 is a flowchart describing the operation of one embodiment of the unwrap procedure in more detail. The first step performed by this procedure is identifying the operating system being used, in step 100. This step is useful because different methods may be used with different operating systems. All code that may be used to run in various operating systems may be placed in this unwrap procedure. This procedure also may contain the decompression/decryption code, for example or any other computer program code to be executed.

The executed application then opens the original executable file as a data file and searches for the begin and end tags of the device driver and hidden files in step 102. The device driver code is copied into memory and loaded into the operating system in step 104. The unwrap procedure then informs the device driver of the name of the original application file, offsets of the hidden files and the name of a phantom directory, which is typically randomly generated (step 106). This communication may be performed using a "DeviceIOControl" function call in the Windows95 operating system. The unwrap procedure then makes a call to the operating system to execute the hidden file in the phantom directory, in step 108.

The operation of one embodiment of a device driver will now be described in connection with FIG. 6. After the device driver is loaded into the operating system, it hooks into a position between the operating system and a file system driver (FSD), in step 110, to intercept calls made by the operating system to the FSD for data from files in the phantom directory. The FSD is the code within the operating system that performs physical reading and writing of data to disk drives. The operating system makes requests to the FSD for data from files in directories on the disk drives. The driver then receives information from the unwrap procedure including the name of the original file, the location of hidden files within the original file, and the name of the phantom directory created by the unwrap procedure (step 112). The device driver opens the original file as a read only data file. The device driver now traps calls, in step 114, made from the operating system for files in the phantom directory. Calls to other directories are ignored and passed on to the original destination. The device driver then reads the data from the original data file, decrypts and decompresses it, and returns the decrypted/decompressed data to the operating system in step 116.

For example, if the offset for the hidden application in the original data file is 266,270 bytes and the operating system asks for 64 bytes starting at offset 0 of the hidden application in the phantom directory, the device driver reads 64 bytes from the original file starting at offset 266,270, decrypts/decompresses those 64 bytes, and returns the first 64 decrypted/decompressed bytes back to the operating system. From the point of view of the operating system, the 64 bytes appear to have come from the file in the phantom directory. Steps 114 and 116 are performed on demand in response to the operating system.

A block diagram of the computer system in this embodiment, with a device driver loaded and in operation, will now be described in more detail in connection with FIG. 7. FIG. 7 illustrates the operating system 120, the loaded device driver 122, a file system driver 124, the original executable file 126 as it may appear on disk and the unwrap procedure 128. The executable file may in fact be on a remote computer and accessed through a network by the device driver. The unwrap procedure causes the operating system to begin execution of the hidden file by issuing an instruction to execute the file in the phantom directory, as indicated at 130. This command is issued after the device driver 122 is informed of the file name of the original executable file 126, offsets of the hidden files within that file and the name of the phantom directory, as indicated at 132. The operating system then starts making calls to the phantom directory as indicated at 134. The device driver 122 traps these calls and turns them into requests 136 to the file system driver to access the original executable file 126. Such requests actually are made to the operating system 120, through the device driver 122 to the file system driver 124. The file system driver 124 returns encrypted code 138 to the device driver 122. The encrypted code 138 actually passes back through the device driver 122 to the operating system 120 which in turn provides the encrypted code 138 to the device driver 122 as the reply to the request 136 for the original file. The device driver 122 then decrypts the code to provide decrypted code 140 to the operating system 120.

Figure 8:
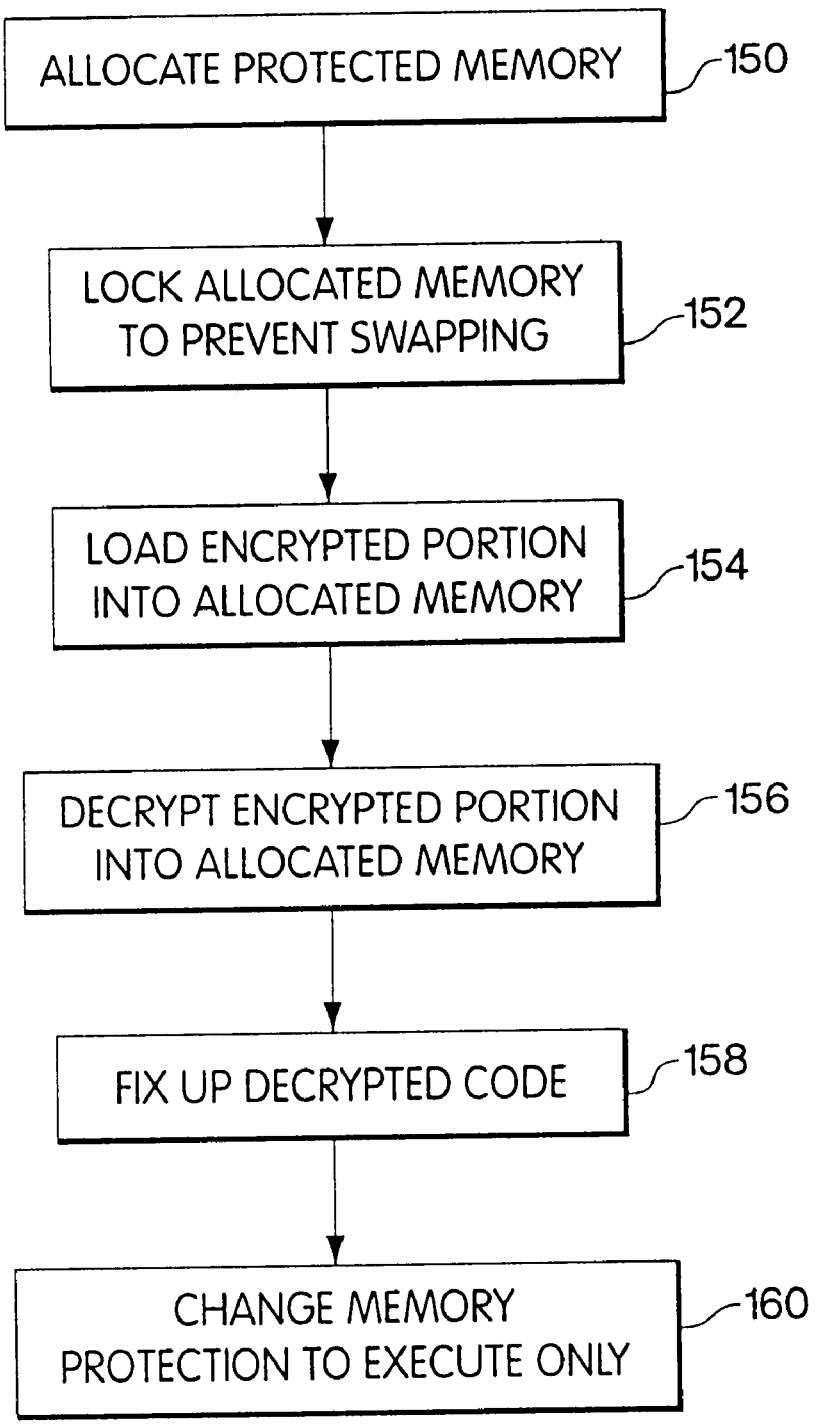
FIG. 8 is a flowchart describing operation of an example unwrap procedure in another embodiment of the invention.

Another embodiment of the invention will now be described in connection with FIG. 8. This embodiment may be implemented using the WindowsNT 4.0 operating system, for example. In this embodiment, the device driver portion 52 of the computer program product is not used. The unwrap procedure for this embodiment begins by identifying the operating system being used similar, which is step 100 in FIG. 5. If the operating system is Windows NT 4.0, for example, a different unwrap procedure for this embodiment is performed. Before describing this unwrap procedure, a brief description of some of the available operating system commands will be provided.

Currently, under all versions of the Window operating system or operating environment from Microsoft Corporation (such as Windows 3.1, Windows 95 and Windows NT 3.51 and 4.0) all executable files (.exe) or dynamic link library (.dll and .ocx) files, which are executable files with different header and loading requirements than .exe files, that are loaded into memory by the operating system must reside as a file either locally, e.g., on a disk drive or remotely, e.g., over a network or communications port. All further references herein to loading an executable will be using the Win32 function calls used in Windows 95 and NT 3.51 and 4.0 operating systems. The CreateProcess( ) function which loads files with an .exe extension takes ten parameters:
BOOL CreateProcess(//Prototype from Microsoft Visual C++ Help Documentation
    LPCTSTR lpApplicationName, //pointer to name of executable module
    LPTSTR lpCommandLine, //pointer to command line string
    LPSECURITY_ATTRIBUTES lpProcessAttributes, //pointer to process security attributes
    LPSECURITY_ATTRIBUTES lpThreadAttributes, //pointer to thread security attributes
    BOOL bInheritHandles, //handle inheritance flag
    DWORD dwCreationFlags, //creation flags
    LPVOID lpEnvironment, //pointer to new environment block
    LPCTSTR lpCurrentDirectory, //pointer to current directory name
    LPSTARTUPINFO lpStartupInfo, //pointer to STARTUPINFO
    LPPROCESS_INFORMATION lpProcessInformation //pointer to PROCESS_INFORMATION
);

Three of these parameters are pointers to strings that contain an application file name, command line parameters, and the current directory. The other parameters are security, environmental, and process information. The LoadLibrary( ) function takes one parameter that is a pointer to a string that contains the application file name:
HINSTANCE LoadLibrary(//Prototype from Microsoft Visual C++ Help Documentation
    LPCTSTR lpLibFileName //address of filename of executable module
);

The LoadLibraryEx( ) function takes three parameters the first being the same as LoadLibrary( ), the second parameter must be null, and the third tells the operating system whether to load the file as an executable or as a data file in order to retrieve resources such as icons or string table data from it and not load it as an executable:
HINSTANCE LoadLibraryEx(//Prototype from Microsoft Visual C++ Help Documentation
    LPCTSTR lpLibFileName, //points to name of executable module
    HANDLE hFile, //reserved, must be NULL
    DWORD dwFlags //entry-point execution flag The CreateFile( ) function is used to create and open files and to load files such as device drivers. This function also requires a pointer to a string that contains the name of a physical file:
HANDLE CreateFile(//Prototype from Microsoft Visual C++ Help Documentation
    LPCTSTR lpFileName, //pointer to name of the file
    DWORD dwDesiredAccess, //access (read-write) mode
    DWORD dwShareMode, //share mode
    LPSECURITY_ATTRIBUTES lpSecurityAttributes, //pointer to security descriptor
    DWORD dwCreationDistribution, //how to create
    DWORD dwFlagsAndAttributes, //file attributes
    HANDLE hTemplateFile //handle to file with attributes to copy There are other functions such as MapViewOfFile( ) and MapViewOfFileEx( ) that map areas of memory to an already opened physical file through a handle to that file. They have the following parameters:
LPVOID MapViewOfFile(//Prototype from Microsoft Visual C++ Help Documentation
    HANDLE hFileMappingObject, //file-mapping object to map into address space
    DWORD dwDesiredAccess, //access mode
    DWORD dwFileOffsetHigh, //high-order 32 bits of file offset
    DWORD dwFileOffsetLow, //low-order 32 bits of file offset
    DWORD dwNumberOfBytesToMap //number of bytes to map
LPVOID MapViewOfFileEx(//Prototype from Microsoft Visual C++ Help Documentation
    HANDLE hFileMappingObject, //file-mapping object to map into address space
    DWORD dwDesiredAccess, //access mode
    DWORD dwFileOffsetHigh, //high-order 32 bits of file offset
    DWORD dwFileOffsetLow, //low-order 32 bits of file offset
    DWORD dwNumberOfBytesToMap, //number of bytes to map LPVOID lpBaseAddress //suggested starting address for mapped view All of the foregoing functions directly use a pointer to a string that is a physical file. The only file functions that do not directly use a physical filename are functions like CreateNamedPipe( ), which has the following parameters:
HANDLE CreateNamedPipe(//Prototype from Microsoft Visual C++ Help Documentation LPCTSTR lpName, //pointer to pipe name
DWORD dwOpenMode, //pipe open mode
DWORD dwPipeMode, //pipe-specific modes
DWORD nMaxInstances, //maximum number of instances
DWORD nOutBufferSize, //output buffer size, in bytes
DWORD nInBufferSize, //input buffer size, in bytes
DWORD nDefaultTimeOut, //time-out time, in milliseconds
LPSECURITY_ATTRIBUTES lpSecurityAttributes //pointer to security attributes structure
);

The string to which CreateNamedPipe( ) points using the first parameter is a string that both an existing executable and the operating system know about and does not exist physically. Unfortunately both of the executables that "know" this private name could only be loaded using one of the other procedures that required a physical file. Currently it is not possible to load an executable using a "named pipe" name. Both of or any executables that use the name of the "named pipe" already must have been loaded into memory.

All of the foregoing functions require a physical file because all of them use "file mapping" processes. File mapping allows large executable files to appear to be loaded rapidly since they are rarely completely loaded into memory but rather are mapped into memory. The detriment to this mapping capability is that executable code must remain in physical memory in a file in unencrypted form in order to be loaded, unless there is a middle layer or file system driver that the operating system uses as a physical layer and that decrypts the executable code to the operating system on demand. The potential weakness here is that another file system driver can hook into the operating system to monitor traffic between the operating system and all file system drivers and capture decrypted executable code passing from the file system driver to the operating system. Some operating systems allow such monitoring more than others. Many anti-viral software packages use this technique to prevent computer virus attacks.

One method of loading and executing encrypted executable computer program code is to use a stub executable having two parts. The first part is the normal front end loader code that all executables have. In addition, the first part would perform any authorization which may include receiving a password from the user, then allocate enough memory to hold hidden encrypted code when it is decrypted, either in its entirety or a portion of it, copy the encrypted code into that area of protected (and preferably locked so no disk swapping occurs) memory, decrypt it once it is in memory and only in memory, and then have the operating system load the code only from memory therefore bypassing any file system drivers or TSRs so they have access to only encrypted code.

Some of the file functions listed above and similar functions on other operating systems could be modified easily by a programmer having access to source code for those operating systems, or a new operating system may be made to provide functions which allow direct loading of executable code from memory rather than physical files. For example, in the Win32 commands, a command similar to CreateProcess( ) command could be provided. The command should have a few extra parameters including the process identifier of the process that contains the now decrypted executable code, the memory address of the start of the decrypted code, and the size of the decrypted code. The command could also contain a parameter specifying a "call back" function within the first process that would provide decrypted code on demand directly to the operating system through a protected buffer, therefore allowing only a portion of the encrypted code to be decrypted at any one time instead of in its entirety, for better protection and less memory use. The second parameter of the LoadLibraryEx( ) command that now needs to be NULL could be expanded to hold a structure that contained the same information. Both of these and other similar functions could be changed or created to allow loading executable code either as an .exe, .dll, or other extensions or identifiers, such as by using a "named pipe" name that only the operating system and process that holds decrypted code know about and having the operating system load from the named pipe.

Alternatively, without having such additional capabilities in the operating system, an application program can be divided into two parts. The first part is code that is common to all applications such as code for allocating memory off the heap and code that provides some interaction with the user. This kind of code is generally not code that the content provider is concerned about copying. The second part is the code that the content provider believes is valuable. Typically this valuable code is a business logic code or what would be considered a middle tier of a three-tier environment. A content provider would like to protect this second part of the code, at least much more that the first part of the code. The content provider would place all of the important code to be protected inside a dynamic link library and the code that is not that important would reside in the front end "stub" executable. Both of these would be combined into another executable containing the .dll in encrypted form only, along with any other files, data, information, and/or tables for holding, for example, hardware identifiers. This other executable is the final digital information product.

The first part of the digital information product, i.e., the executable stub, would load and execute normally like any other application. It then would perform any authorization procedures. Once the proper authorization or password was completed successfully, an unwrap procedure would be performed as will now be described in connection with FIG. 8, it would then allocate enough protected memory using a function like VirtualAlloc( ) as shown in step 150:

DWORD nFileSize=0;
DWORD nPhantomFileSize=0;
DWORD exeOffset=0;
DWORD nPreferredLoadAddress=GetPreCompiledLoadAddress( );
CString cCommandFile=UnwrapGetNTCommandFile( );
exeOffset=UnwrapGetDllOffset(cCommandFile);
nFileSize=UnwrapGetDllSize(cCommandFile);
nPhantomFileSize=nFileSize+0x3000; //add any needed extra space
//Increase buffer size to account for page size (currently Intel page size).
DWORD nPageSize=GetPageSize( );
nPhantomFileSize+=(nPageSize-(nPhantomFileSize % nPageSize));
//Allocate the memory to hold the decrypted executable.
LPVOID lpvBlock=VirtualAlloc((LPVOID) nPreferredLoadAddress,
　nPhantomFileSize,
　MEM_RESERVE|MEM_COMMIT, PAGE_READWRITE);

This function can request a particular address space. Preferably, this address space is the preferred load address space to which the .dll was linked in order to minimize any needed relocation and fix up code. The stub executable may lock that area of memory in step 152, for example by using VirtualLock( ) to prevent any memory writes to a swap file, depending on the operating system, as shown below:

BOOL bVLock=VirtualLock((LPVOID) nPreferredLoadAddress, nPhantomFileSize);

The memory area still should be secure even without this preventive step since the Windows 95 and NT operating systems do not allow any user access to swap files.

The encrypted code is then copied from the digital information product into the allocated protected memory in step 154, for example by using the following command:

UnwrapCopyHiddenExeToMem(cCommandFile, exeOffset, nFileSize, (char *) lpvBlock);

Once in memory, the stub would then decrypt the code to that same portion of memory in step 156, for example by using the following commands:

CwrapDecryptSeed(cPassword.GetBuffer(0), cPassword.GetLength( ));
CwrapDecrypt((unsigned char *) lpvBlock, 0, nFileSize);

Any "fix up and relocation" type services would then be performed in step 158, for example by using the following command:

UnwrapFixUpAndRelocateDll(lpvBlock);

Possibly, the memory protection may be changed to execute only in step 160, for example by using the Virtual-Protecto command as follows:

DWORD lpflOldProtect; //variable to get old protection
BOOL bVProtect=VirtualProtect((LPVOID) nPreferredLoadAddress, nPhantomFileSize,
   PAGE_EXECUTE,
   &lpflOldProtect);

Function calls then can be made into that area of memory that now contains the decrypted code:
UnwrapDoDllAlgorithms( );

Some of the "fix up" operations to be performed above include placing the addresses of external or stub.exe functions into the address place holders of the decrypted .dll or internal code, by using commands similar to the following:

WriteAddress((char*) 0×0a406104, (DWORD) &CallBackFunction1);
WriteAddress((char*) 0×0a406100, (DWORD) &CallBackFunction2);

For instance a wrapper function could be created in the outer stub.exe that received a size parameter, allocated that amount of memory off of the heap, and passed back the starting address of that block of memory. Another example would be to have encrypted algorithms within the hidden, encrypted .dll which would be called at run time from the front end stub once decrypted within protected memory. The dynamic link library would be compiled and linked to expect a pointer to a function that took that parameter and/or returned a value by including prototypes in the header file as follows:

void (*lpCallBackFunc1)( );
void (*lpCallBackFunc2)(unsigned long);

Function calls to "external" functions also could be added as follows:
(*lpCallBackFunc1)( );
unsigned long z=x*x;
(*lpCallBackFunc2)(z);

At run time the "fix up" code would take the run time address of that "wrapper function" and place it into the pointer address within the .dll block of code as follows:
WriteAddress((char*) 0×0a406104, (DWORD) &CallBackFunction1);
WriteAddress((char*) 0×0a406100, (DWORD) &CallBackFunction2);

This information is readily available using the .cod output files from the compiler, an example of which follows:

```
_TestSum PROC NEAR                                      ; COMDAT
; Line 8
00000    56                    push    esi
; Line 23
00001    ff 15 00 00 00
         00          call      DWORD PTR _lpCallBackFunc1
; Line 24
00007    8b 44 24 08           mov     eax, DWORD PTR _a$[esp]
0000b    50                    push    eax
0000c    e8 00 00 00 00 call   _TestSquare
00011    83 c4 04              add     esp, 4
00014    8b f0                 mov     esi, eax
; Line 25
00016    8b 44 24 0c           mov     eax, DWORD PTR _b$[esp]
0001a    50                    push    eax
0001b    e8 00 00 00 00        call    _TestSquare
00020    83 c4 04              add     esp, 4
00023    03 c6                 add     eax, esi
; Line 28
00025    5e                    pop     esi
00026    c3                    ret     0
_TestSum ENDP
_TEXT    ENDS
;           COMDAT _TestSquare
_TEXT    SEGMENT
_x$ = 8
_TestSquare PROC NEAR                                   ; COMDAT
; Line 30
00000    56                    push    esi
; Line 32
00001    8b 74 24 08           mov     esi, DWORD PTR _x$[esp]
```

-continued

```
00005      0f af f6            imul     esi, esi
; Line 34
00008      56                  push     esi
00009      ff 15 00 00 00
           00        call      DWORD PTR __lpCallBackFunc2
0000f 83 c4 04       add       esp, 4
00012      8b c6               mov      eax, esi
; Line 36
00014      5e                  pop      esi
00015      c3                  ret      0
__TestSquare ENDP
```

Such information also is available from map output files from the linker where the "f" between the address (i.e., 0a406100) and the object file (i.e. Algorithms.obj) means it is a "flat" address (i.e., hard coded by the linker) and the lack of an "f" means that it is an address pointer to be supplied at run time (load time) where the address that is contained in that address location is used and not the actual address location (i.e., the address that is contained at address location 0a406100 and not 0a406100 itself):

```
0001:00000000    __TestSum         0a401000 f   Algorithms.obj
0001:00000030    __TestSquare      0a401030 f   Algorithms.obj
0003:00001100    __lpCallBackFunc2 0a406100     Algorithms.obj
0003:00001104    __lpCallBackFunc1 0a406104     Algorithms.obj
```

When the code inside the .dll makes a "call" to a dereferenced pointer, it would jump to the correct function in the outer code and return the expected return value (if any). For example:
void CallBackFunction1( ){
//This is the first function that exists in the Stub executable
//whose address has been placed at the appropriate location inside the "dll" code
//that has now been decrypted in a block of memory. The code inside the "dll"
//makes a function call to this function. In its encrypted state, the "dll" does not contain
//this address, but merely has a placeholder for the address. The "dll" has enough space allocated to hold an
//address of this size. After the "dll" has been decrypted at run time, its address is
//placed in that location so the code inside the "dll" that references (or more
//appropriately dereferences) that address can jump (which is function call) to this //address.
AfxMessageBox(
_T("This is the FIRST Stub.exe call back function being called from the dll.")); return;
}
void CallBackFunction2(DWORD nNumber){
//See comment for CallBackFunction1 except this function receives a parameter off
//of the stack. It could also return a value as well.
   CString
   cString(
_T("This is the SECOND Stub.exe call back function being called from the dll"));
   har buffer[20];
   ltoa(nNumber, buffer, 10);
   cString+=_T("with a parameter of");
   cString+=buffer;
   cString+=_T(".");
   AfxMessageBox(cString.GetBuffer(0));
   return;
}

The outer stub.exe would make the same kinds of jumps or function calls into the now protected decrypted code block as follows:
   DWORD c;
//This command declares a function pointer. This command is different for different function
//calls. Here the called function takes two integer parameters and
//passes back a DWORD.
//DWORD (*lpFunc)(DWORD,DWORD);
//The function pointer is then pointed to the starting address of the function in the
//block of memory that now holds the decrypted DLL.
lpFunc=(DWORD (*)(DWORD,DWORD)) UnwrapFixUpAndRelocateDll( );
//Now call that "function" which is really like all function calls, i.e., a jump to
//the address where that function exists. In this case, two
//variables are passed to that function and returning a value from that function. This function illustrates that the function call
//can be more complicated than merely a simple jump
//to an address. Inline assembler code may be used to push the variables onto
//the stack frame and return the variable from the eax register, but this function enables
//the C++ compiler to do the same function.
c=(DWORD) (*lpFunc)(a, b);

This mechanism requires the unwrap procedure and the now decrypted code to have intimate knowledge about procedural interfaces of each other but no knowledge about each other's implementation. This is the way most executable .exe files and .dll files behave but with the addition of a series of "wrapper" functions on either side for communication. This method works under Windows 95 and Windows NT 4.0 operating systems and should work under Windows NT 3.51 and other operating systems.

Another modified version of this mechanism that works under the Windows NT 4.0 operating system because of functions specific to Windows NT 4.0 would be to have another hidden and/or encrypted executable within the digital information product. This executable would be copied to a physical disk in an unencrypted form, launched or loaded with the CreateProcess() command in its current form but called with a parameter to load the executable in suspended mode:
BOOL success=CreateProcess(cFrontEndExe.GetBuffer(0), 0, 0, 0, TRUE,
   CREATE_NEW_CONSOLE|CREATE_SUSPENDED,
   0, 0, &startUpInfo, &processInfo);

Then the first process would copy the encrypted dll into its own process and decrypt it, allocate enough memory using VirtualAllocEx( ) in its current form in the second process that has just loaded the expendable front end executable in a suspended state as follows:
LPVOID lpvBlockEx=VirtualAllocEx (processInfo.hProcess,
(LPVOID) nPreferredLoadAddress, nPhantomFileSize, MEM_RESERVE|MEM_COMMIT, PAGE_READWRITE);

The decrypted code is copied from the first process to the second suspended process using WriteProcessMemory( ) in its current form:
BOOL bWriteProcessMemory=WriteProcessMemory ((HANDLE) processInfo.hProcess,
(LPVOID) lpvBlockEx, (LPVOID) nPreferredAddress, (DWORD) nPhantomFileSize, (LPDWORD) &nBytesWritten);

The primary thread of the previously launched second process is then resumed:
DWORD nResumed=ResumeThread(processInfo.hThread);

Any necessary function pointers are then placed in the correct locations by the second process, the area of memory is locked to prevent any writes to a swap file, and the memory protection is changed to execute only as follows:
WriteAddress((char*) 0x0a406104, (DWORD) &CallBackFunction1);
WriteAddress((char*) 0x0a406100, (DWORD) &CallBackFunction2);
BOOL bVLock VirtualLock((LPVOID) nPreferredLoadAddress, nPhantomFileSize);
DWORD lpflOldProtect; //variable to get old protection
BOOL bVProtect=VirtualProtect((LPVOID) nPreferredLoadAddress,
  nPhantomFileSize, PAGE_EXECUTE, &lpflOldProtect);

The program can continue running by making and receiving calls to and from the decrypted dynamic link library that now resides in the protected memory of its process using commands such as the following:
DWORD c;
DWORD (*lpFunc)(DWORD,DWORD);
lpFunc=(DWORD (*)(DWORD,DWORD)) ExpendableGetEntryAddress( );
c=(DWORD) (*lpFunc)(a, b); The first process can either close down or launch another instance of that same process.

In either of these implementations using the same process or launching into a second process, the hidden encrypted code never passes through a file system driver or memory resident program in decrypted form. Code can be split up among different dynamic link libraries so that no two would reside in memory at the same time in order to protect code further. Both of these systems can be implemented using the Win32 function calls. If additional functions, similar to a CreateProcesso command or a LoadLibrary( ) command but that take a process identifier and address location in memory to load in an executable instead of a physical file, are provided in an operating system then the entire executable and dynamic link library can be hidden, encrypted, and protected on the physical disk and then decrypted within protected memory and use the operating system loader to load it directly to the operating system from memory without residing in decrypted form on any physical medium.

Figure 9:
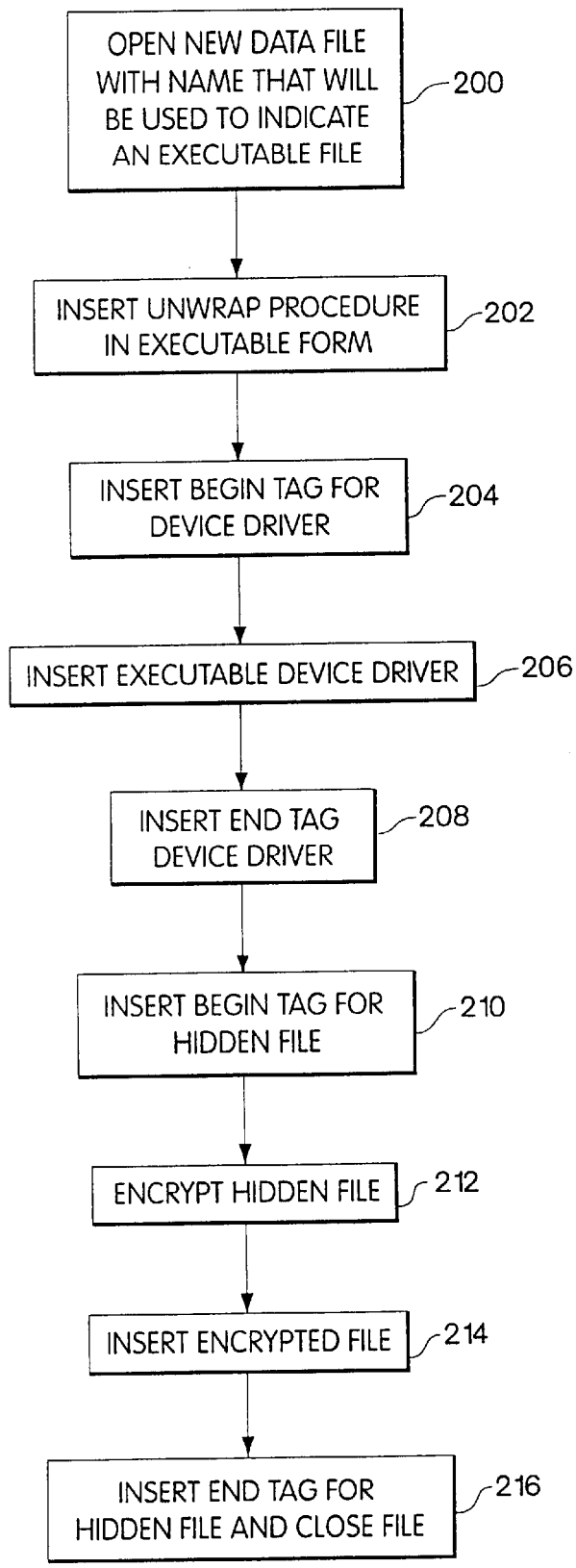
FIG. 9 is a flowchart describing how a computer program product such as shown in FIG. 3 is constructed.

Having described the operation and use of the computer program product in accordance with the invention, embodiments of which are described above in connection with FIGS. 3–8, and the operation of the unwrap procedure and device driver it contains, the process of constructing such a computer program product will now be described in more detail. Referring now to FIG. 9, an embodiment of this process for creating a computer program product is shown. This process can be applied to any digital information including an arbitrary executable computer program, dynamic link libraries and related files of data. All digital information is treated as mere data by this process. Each separate data file is combined into a single file by this process, with an executable program for performing the unwrap procedure, and optionally executable program code for a virtual device driver, into the computer program product. Each file of hidden information has a unique location and is identified by its own begin and end markers as shown in FIG. 3. The first step of this process is opening a new data file for the computer program using a name that will be used to indicate an executable file (step 200). For example, an executable word processing program may be named "word_processor.exe" in the Windows95 operating system.

The three portions of the computer program product are then inserted into the open data file. First, the unwrap procedure is inserted at the beginning of the file in an executable format in step 202. The begin tag for the optional device driver is then inserted in step 204. The executable device driver program code is then inserted in step 206, followed by its corresponding end tag in step 208. For each hidden file to be inserted into this computer program product, steps 210 to 216 are performed. First, the begin tag is inserted in step 210. The begin tag also may include an indication of a unique name of the file which will be used as its name in the phantom directory created by the unwrap procedure. The hidden file is then encrypted and/or compressed in step 212 and inserted into the data file in step 214. The end tag for the hidden file is then inserted in step 216. The device driver and all of the tags may be encrypted also if the unwrap procedure has suitable decryption procedures. The computer program file is closed when the last hidden file is processed.

Using the present invention digital information, such as executable program code or various kinds of data, is loaded and unloaded as needed, and thus does not take up any more memory than is necessary. At no time does unencrypted digital information, such as computer program code, exist on disk in accessible and complete decrypted form. Because the original digital information is available as a read only file in one embodiment of the invention accessible only to the device driver, the digital information may be accessed over networks, from a CD-ROM or from a DVD, and can be made to have a limited number of uses. This mechanism is particularly useful for controlling distribution of computer programs, digitized movies or other information while reducing the cost of such distribution and control. For example, software may be distributed over a network on a single use basis, and charges may be levied on a per use basis. The ability to reverse engineer an application program also may be reduced.

One benefit with this system over some other systems for preventing unauthorized access to digital information is that the content provider maintains control of the encryption applied to the information how it may be decrypted. Any need for either a centralized facility or a predetermined decryption program is eliminated. An operating systems manufacturer or other platform vendor merely provides the capability for the information to be accessed and decrypted on the fly. Since the valuable information and any other tables of authorization codes, passwords, or hardware identifiers that the content provider may use to secure the information resides in one large encrypted file, it becomes difficult, if not impossible, for someone to determine just where any of this information exists.

A potential scenario with authorization procedure in which the present invention may be used is the following. A consumer purchases a DVD disk containing a movie. The user puts the disk into the player. This is the first time the disk is installed. The content provider's functions are loaded into the DVD chip, which looks in the encrypted table and sees that this is the first time this disk is being played. The player then displays on a screen a numeric identifier and toll free phone number. The consumer calls the toll free phone number and inputs the numeric identifier that was displayed on the screen. The content provider provides a numeric password based on the numeric identifier that the user inputs into the DVD. The content provider may develop a database of information about its consumers that also may be used to detect pirating of the digital information product. Now that this authorization has taken place, the software that the content provider wrote, and is now in the DVD chip, takes a hardware identifier from the DVD and encrypts it and puts it in the encrypted and buried table on the disk. Alternatively, the data may be decrypted in memory and re-encrypted back onto the disk using the hardware identifier as part of a key. Now that disk will run and show the movie and will only run on that DVD and no other. The content provider could allow for a table of hardware id's so they could limit the number of DVD's that disk would run on or a limited number of times it can be shown. It should be understood that many other authorization procedures may be used.

In the foregoing scenario, the movie is encrypted on the same disk inside of the encrypted file that contains the table and functions the content provider distributed. The movie is decrypted by the decryption functions contained in the file directly to the DVD chip. At no time does the movie reside anywhere in decrypted form. The content provider can protect the movie with any desired level of security (for both encryption and authorization).

In the present invention, the onus of protection of content does not reside with a hardware manufacturer or platform provider but in the hands of the content provider. The hardware manufacturer only provides the mechanism to protect the digital information through the operating system. The technique and implementation of protection resides in the hands of the content provider. This mechanism allows the content providers to change the level of security as needed without any modifications to the hardware. The security of the content is provided by the encryption/decryption algorithms, public/private keys, and authorization methods which are determined by the content provider. Even each individual product can have its own encryption/decryption algorithms and/or public/private keys. All of these can be changed and enhanced as the market demands.

The present invention also could be used for on-line or live use of digital information. For example, a movie could be retrieved on demand and recorded by a consumer. A set top box could receive the digital information, decrypt it, and then re-encrypt and store the information using, for example, a hardware identifier of the set top box. Since home movies digitally recorded would be encrypted using the hardware identifier of the device used in recording, that home movie could not be played on another or only on a limited number of other devices and/or for only a specified number of times depending on the wishes of the content provider. Since the algorithms are downloaded at the time of recording from a service provider, e.g., the cable company, the content provider (movie company) would provide the encrypted data to the service provider to present to their customers. The service provider need not be concerned with the encryption/decryption and authorization functions used by the content provider. Similar uses are possible with other data transmission systems including, but not limited to, telephone, cellular communications, audio transmission including communication and the like.

In another embodiment, the stub executable program is a first process that is implemented similar to a debugging tool such as the SoftIce debugger from NuMega Technologies or the WinDebug debugger from Microsoft Corporation for Ring 0 kernel level debugging for an Intel processor based architecture, or the CodeView debugger for ring 3 application level debugging. Such a debugger controls execution of a program to be debugged as a second process and steps through each program statement or opcode of the debugged program. The debugging tool could be modified to monitor each opcode that indicates a jump to a program fragment, such as each instruction or a block code. If the program fragment to be executed is not decrypted, the modified debugger decrypts the program fragment before the jump command is allowed to execute. Each program fragment may be re-encrypted after execution. Clearly, unnecessary debugging commands may be omitted from the modified debugger.

There are several other applications and modifications to the system described above. In some of these applications, decryption into protected memory is not required if the recipient of the information is a trusted user.

For example, one method for encryption is the use of a random "one time pad." In this method, the "pad" is used to both encrypt and decrypt data, for example using an exclusive or function of the pad and the data, and is known only at the sending and receiving locations. After the encryption and decryption processes are finished the identical pads are then destroyed. This "one time pad" is a non-repeating pad. Because the pad is known only at the sending and receiving end, it is agreed upon ahead of time and in the case of multiple pads, which pad to use. If the pad is sent over the same transmission line (or different line) as the encrypted data, the pad could be intercepted. Someone at the sending or receiving end, other than the sender or intended recipient, who knew which pad to use would be able to decrypt the encrypted data.

Data encrypted with a truly random non-repeating one time pad is virtually indistinguishable from a truly random non-repeating one time pad. In one embodiment, a one-time pad is shuffled in with the encrypted data, by either a function or randomly.

The combination of the encrypted data and one time pad may obscure which parts are encrypted data and which parts are the one time pad. The function for shuffling or random shuffling may be changed frequently, or it may be one function with parameters, such as a seed for a random number generator, that are changed frequently. The executable code for the shuffling is small and may be changed frequently. This executable code, and its parameters, can be changed and combined with the executable code for decrypting the data, the encrypted data, and the random one time pad, in the manner described above. The executable code for shuffling and its parameters may be contiguous or discontiguous, and also may be encrypted. Special changing (possibly encrypted) tags could let the currently running algorithm know when to change parameters or launch a new decrypting algorithm. Changing parameters and decrypting code more frequently helps to thwart the efforts of a brute force attack or "characters counting" attack. It may be more difficult to tell which part was the encrypted data, random one time pad, algorithm, or parameters, because they are all combined together and constantly changing. A pass phrase or password may be used to generate parameters to shuffling function. This method could be used in both stream and block ciphers. More than one message may be mixed in together.

A disadvantage with a random one time pad is that the amount of random data in the one time pad is equal to the amount of data that is encrypted. To alleviate this problem, one or more computers on a computer network, such as the Internet, may be used to create and store a massive amount of truly "random" data. Algorithms may be executed against this data to ensure that there are no repeating sequences of data. A device sends a request packet of data that includes a "block" address into this "random" data matrix, the amount of the data needed, and a skipping number or function. In response to this request packet, the internet site then transmits the random data starting at a particular block address, collects a certain amount of data by skipping zero or more data bytes each time it collects a block of data according to the skipping number or function and then sends this random data stream to the requesting party. This data stream as well as the requesting packet can also be encrypted to increase security.

The random data received from the remote location may be used to encrypt the data and to send the encrypted data, with the identifier of the block address, amount of random data used, and the skipping number or function used to request the data. The recipient then issues the same request to the remote location to receive the one time pad for decryption. The parameters of the request for the one time pad also may be encrypted when sent to the destination.

The skipping number or function may be simple or complex. For example, it may specify a fixed number of bytes. Alternatively, a skipping function may be a random or pseudorandom function. The blocks of random data also may be envisioned as a multidimensional space or matrix in which a trajectory is followed by an object (such as a ball) over time to select each block of random data. This trajectory may vary with parameters specified by a user such as initial conditions (e.g., direction, speed, acceleration), speed, acceleration, rotational speed and acceleration, shape or other characteristics of the object following the trajectory, and other factors. A chaotic trajectory also may be defined. Two or more trajectories also may be used.

A device also can have two separate Internet connections. One of these connections can be transmitting requests for and receiving "random" data of a one time pad, whereas the other connection may be used for communicating encrypted messages.

In one application, data encrypted in this manner may be sent to a remote storage facility, which is a computer accessible on a computer network by many individuals that enables the individuals to store data. This encrypted information may be retrieved from the remote storage facility and decrypted using the same process. A packaging tool may be made available to multiple users that use the remote storage facility. Each user may select their own algorithm, keys, and other security mechanisms to package their data into a self-decrypting encrypted data file.

In another application, an entertainment device like an music or movie playing device could have a one or more private keys or unique identifiers buried, hidden, or encrypted within it and one or more public keys published on an internet site or other site accessible to content providers or others. A software device could be transferred by the individual who owned the device from one platform to another. These devices may be embedded in hardware or be software playing devices that would be downloaded. A content provider or other individual accesses the published public key for the device to encrypt content, using their private key, and sends the encrypted content, and their public key, to the device where the device would use its private key to decrypt the content with an algorithm already contained in the device or one sent with the content by the content provider. The device also may access the public key of the content provider through another means.

In another application, computer games or other digital data may be distributed using the self-decrypting technology described above. For example, a game developer may provide executable games to a computer system that packages the game into a self-decrypting executable program in the manner described above. This computer system may be accessed, for example, by other users over a computer network to access games. This computer system, or another computer system, may be used to authenticate usage and/or collect payment for usage of the games. Alternatively, a computer system may be made available to developers that provides algorithms, authentication and revenue collection programs among which a developer may select. A packaging tool such as described above then packages the game program with the selected algorithms, authentication and revenue collection programs. The game developer can use its system instead of a central third party to track usage of its games and collect revenue.

In another application, one or more files (executable code and/or data) or data records may be embedded into one or more files that is self decrypting when accessed. For example, a database that may be accessed via SQL (Structured Query Language) statements. Access to the information is determined by the rules described in the database. The database administrator or owner of the database or tables within the database determines these rules, which does not allow for the control of the access to the information by the owner or source of the information, such as a patient that may want to control information in their medical records. The database rules may modified to include authorization and other information for self-decrypting data records into protected memory for analysis by the database system.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalent thereto.

What is claimed is:

1. A method for using a one-time pad for encryption and decryption, comprising:

a requestor requesting from a computer remote from the requestor a portion of random data from a one-time pad, using a request-specific identifier which will be used by the remote computer to identify said portion of random data;

the requestor receiving the portion of random data;

encrypting data using at least some of the portion of random data, producing encrypted data;

sending the encrypted data and the identifier to a recipient; and the recipient accessing the remote computer using the identifier to obtain the portion of random data and using the portion of random data to decrypt the encrypted data.

2. The method of claim 1 further comprising:
   requesting from said remote computer a second amount of random data from said one-time pad, using a second request-specific identifier, different from the first request-specific identifier, which will be used by the remote computer to identify said second amount of random data;
   receiving the second amount of random data;
   encrypting data using at least some of the second amount of random data, producing second encrypted data;
   sending the second encrypted data and the second identifier to a recipient; and
   the recipient accessing the remote computer using the second identifier to obtain the second amount of random data and using the second amount of random data to decrypt the second encrypted data.

3. The method of claim 2 wherein the second request-specific identifier includes information defining a process for selecting random data from within said one-time pad.

4. The method of claim 1 wherein the requester receiving the portion of random data includes the requestor receiving the request-specific identifier with said portion of random data.

5. A method for using a one-time pad for encryption, comprising:
   a requestor requesting from a computer remote from the requestor a portion of random data from a one-time pad, using a request-specific identifier which will be used by the remote computer to identify said portion of random data and includes one or more parameters defining a trajectory for selecting blocks of random data from a multidimensional space associated with random data from said one-time pad;
   receiving the portion of random data;
   encrypting data using at least some of the portion of random data, producing encrypted data; and
   sending the encrypted data and the identifier to a recipient that accesses the remote computer using the identifier to obtain the portion of random data to decrypt the encrypted data.

6. The method of claim 5 wherein at least one of the parameters specifies a random or pseudorandom function.

7. The method of claim 5 wherein at least one of the parameters is specified in the request.

8. The method of claim 5 wherein at least one of the parameters specifies a chaotic trajectory.

9. A method for encryption and decryption of source data, comprising:
   issuing a request from a requestor to a remote computer for a portion of random data, using a request-specific identifier to be associated by the remote computer with selected random data;
   receiving the requested portion of random data;
   encrypting source data using the received requested portion of random data, thereby producing encrypted source data; and
   sending the encrypted source data and the identifier to a recipient that accesses a computer using the identifier to obtain the associated selected random data and decrypts the encrypted source data using said associated selected random data.

10. The method of claim 9, wherein the request-specific identifier is for use in connection with sending selected source data only.

11. A method for using a one-time pad for encryption, comprising:
    requesting from a remote computer an amount of random data from a one-time pad, using an identifier which includes one or more functions defining at least one trajectory for selecting random data from said one-time pad;
    receiving the selected random data;
    encrypting data using the received random data, producing encrypted data; and
    sending the encrypted data and the identifier to a recipient that accesses the remote computer using the identifier to obtain the random data to decrypt the encrypted data.

12. The method of claim 11 wherein at least one of the one or more functions is a random or pseudorandom function.

13. The method of claim 12 wherein a trajectory varies with one or more parameters specified in the request.

14. The method of claim 11 wherein at least one of said trajectories is chaotic.

15. A method for using a one-time pad for encryption, comprising:
    a requestor requesting from a computer remote from the requester a portion of random data from a one-time pad, using an identifier which includes one or more parameters defining a process for selecting random data from a space associated with random data of said one-time pad;
    receiving the portion of random data obtained by execution of said process;
    encrypting data using at least some of the received portion of random data, producing encrypted data; and
    sending the encrypted data and the identifier to a recipient that accesses the remote computer using the identifier to obtain the portion of random data to decrypt the encrypted data.

* * * * *